Dec. 19, 1933.   C. STICHLER   1,940,107
SCRAPER
Filed Jan. 11, 1932

Inventor:
Charles Stichler;
By Jas. C. Wobensmith
Attorney

Patented Dec. 19, 1933

1,940,107

UNITED STATES PATENT OFFICE 1,940,107

SCRAPER

Charles Stichler, Philadelphia, Pa.

Application January 11, 1932. Serial No. 585,976

4 Claims. (Cl. 145—47)

My invention relates to scrapers, and relates more particularly to the construction and arrangement of the parts of a scraping tool of the type such as is used by painters, plumbers, electricians, and other mechanics.

The principal object of my invention is to provide a simple, efficient, and inexpensive tool comprising a handle and a shank extending therefrom, at the end of which scraper blades of various shapes are adapted to be detachably secured, so that the same may be removed for the purpose of sharpening or of replacement by blades of other shapes.

With the foregoing object in view, my invention contemplates a construction of scraping tool, the various parts of which may be inexpensively made and readily assembled, and which, when so assembled, will afford the necessary rigidity required in a tool of this character.

The nature and characteristic features of my invention will be more readily understood from the following description, taken in connection with the accompanying drawing forming part hereof, in which.

Figure 1:
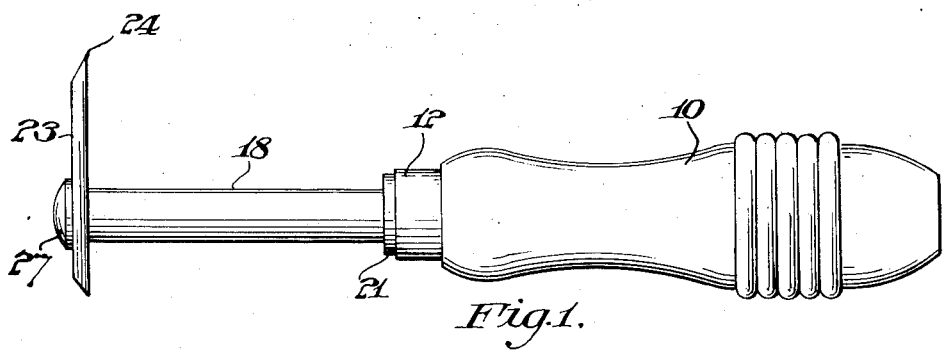
Figure 1 is a side elevation of a scraper embodying the main features of my present invention.
Figure 2:
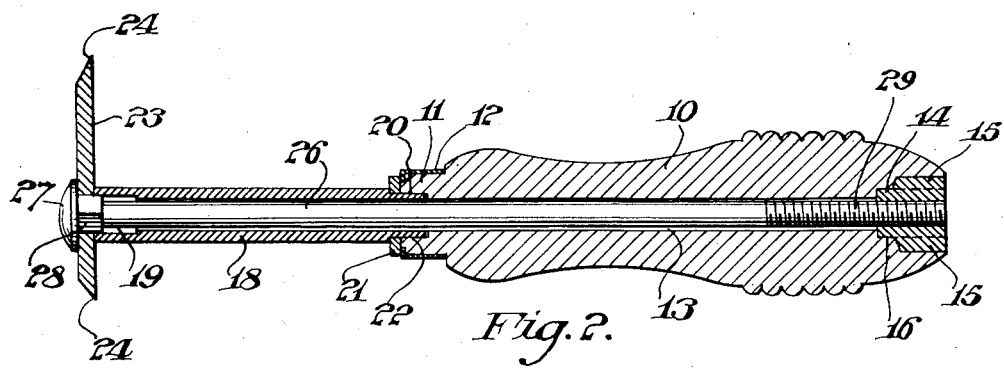
Fig. 2 is a longitudinal, central section thereof.
Figure 3:
Fig. 3 is a side elevation of a preferred form of bolt member employed for securing the various parts to each other.
Figure 4:
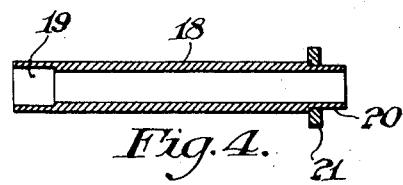
Fig. 4 is a longitudinal, central, sectional view of the shank portion of the tool, detached.
Figure 5:
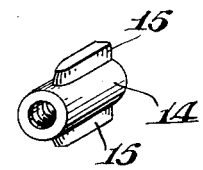
Fig. 5 is a perspective view of a nut adapted to be mounted in the rear end of the handle for engagement by the bolt, for the purpose of securing the various parts to each other.

Referring to the drawing, in the particular embodiment of my invention therein shown, 10 is a turned wooden handle of any preferred style, having a cylindrical extension 11 at the forward end thereof, upon which an annular metallic ferrule 12 is mounted in the customary manner.

The handle 10 is bored from end to end, as at 13. In the rear end of the handle there is mounted a cylindrical nut 14, having wings 15 the forward ends of which may be sharpened. The end of the handle 10 is counterbored, as at 16, to receive the cylindrical portion of the nut 14. In mounting the nut in the end of the handle, the same is first inserted in the counterbored portion 16. The nut is then forced inwardly, causing the wing portions 15 thereof to bite into the wood, thus serving to hold the nut securely in the end of the handle, and at the same time preventing the same from rotating therein.

The shank portion of the tool comprise a tubular member or sleeve 18, the foward end of which is counterbored, as at 19, for a purpose to be presently explained. The end of the sleeve 18, which engages the forward end of the handle 10, is reduced in external diameter, as at 20, and on this portion of reduced diameter a washer 21 is mounted with a forced fit, so that it is permanently retained thereon.

The cylindrical extension 11 at the forward end of the handle 10 is counterbored, as at 22, and into this counterbored portion the reduced portion 20 of the sleeve 18 extends, thereby assuring a proper assembly of the shank with respect to the handle, and causing the bore of the sleeve 18 to register with the bore of the handle 10.

Figure 6:
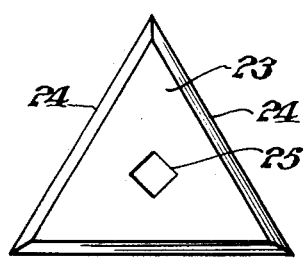
Figs. 6 and 7 are end elevations of two different forms of scraper blades adapted to be secured at the end of the shank portion of the tool.
Figure 7:
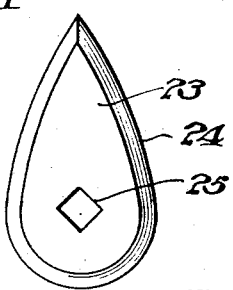

The scraper proper, which is adapted to be secured to the end of the shank portion of the tool, comprises a metallic blade 23 having its edges 24 suitably sharpened. As is well known, the blades may assume a variety of forms, two of the most popular styles being shown in Figs. 6 and 7 of the drawing. The blade is provided with an aperture 25, preferably made of a square or other non-circular shape.

The bolt 26, which serves to secure the various parts to each other, may be of the common form of elongated carriage bolt, having a rounded head 27, adjacent which there is a squared portion 28. The aperture 25 in the scraper blade 23 is complemental in shape to the squared portion 28 under the head 27 of the bolt 26. However, as the blades vary somewhat in thickness, the counterbored portion 19 of the sleeve 18 permits that part of the squared portion 28 which extends beyond the surface of the blade to extend therein so that the entire thickness of the blade is engaged in every instance by the squared portion of the bolt.

In assembling the tool, the desired blade is first placed upon the bolt, and brought to the position to cause the squared portion 28 thereof, adjacent the head of said bolt, to engage the complemental aperture 25 in the blade. The sleeve 18 is then placed upon the bolt, after which the handle is placed thereon and turned with respect to the bolt, causing the nut 14 to engage the threaded portion 29 of the bolt, the bolt meanwhile being held stationary by gripping the knife to hold the same against rotation as the handle is turned to the fastening position.

When the handle is turned sufficiently to cause the nut to be advanced to its limit upon the threaded portion of the bolt, all of the parts will be rigidly held together with a maximum of efficiency.

It will be noted that the various parts may be inexpensively made by production methods, but, nevertheless, when assembled, the tool will be rugged and durable, and well adapted for its intended purposes.

I claim:

1. A scraper comprising a handle, a detachable shank portion, a removable scraper blade mounted at the end of the shank portion, a bolt extending through the blade, the shank, and the handle, and a nut mounted in the rear end of the handle for engagement by a threaded portion of the bolt; the bolt having a rounded head portion and a squared portion adjacent thereto; the blade having a squared aperture complemental to said squared portion adjacent the head of the bolt; the shank comprising a tubular member, and the end of the shank being counterbored to permits a part of the squared portion of the bolt to extend therein.

2. A scraper comprising a handle, a detachable shank portion, a removable scraper blade mounted at the end of the shank portion, a bolt extending through the blade, the shank, and the handle, and a nut mounted in the rear end of the handle for engagement by a threaded portion of the bolt; the forward end of the handle having a cylindrical extension and a ferrule mounted thereon, said cylindrical portion at the forward end of the handle being counterbored; the shank comprising a tubular member having a reduced cylindrical portion extending into the counterbored portion at the forward end of the handle, and a washer mounted thereon for positioning the shank with respect to the handle.

3. A scraper comprising a handle, a detachable shank portion, a removable scraper blade mounted at the end of the shank portion, a bolt extending through the blade, the shank, and the handle, and a nut mounted in the rear end of the handle for engagement by a threaded portion of the bolt; the forward end of the handle having a cylindrical extension and a ferrule mounted thereon, said cylindrical portion at the forward end of the handle being counterbored; the shank comprising a tubular member having a reduced cylindrical portion extending into the counterbored portion at the forward end of the handle, and a washer mounted thereon for positioning the shank with respect to the handle; the bolt having a rounded head portion and a squared portion adjacent thereto; the blade having a squared aperture complemental to said squared portion adjacent the head of the bolt; and the end of the shank being counterbored to permit a part of the squared portion of the bolt to extend therein.

4. A scraper comprising a handle, a detachable shank portion, a removable scraper blade mounted at the end of the shank portion, a bolt extending through the blade, the shank, and the handle, and a nut mounted in the rear end of the handle for engagement by a threaded portion of the bolt; said nut having a cylindrical portion mounted in a counterbore in the end of the handle, and wing portions forced into the end of the handle whereby the nut is retained in the handle and prevented from rotating with respect thereto; the forward end of the handle having a cylindrical extension and a ferrule mounted thereon, said cylindrical portion at the forward end of the handle being counterbored; the shank comprising a tubular member having a reduced cylindrical portion extending into the counterbored portion at the forward end of the handle, and a washer mounted thereon for positioning the shank with respect to the handle; the bolt having a rounded head portion and a squared portion adjacent thereto; the blade having a squared aperture complemental to said squared portion adjacent the head of the bolt; and the end of the shank being counterbored to permit a part of the squared portion of the bolt to extend therein.

CHARLES STICHLER.